(12) United States Patent
Zhang et al.

(10) Patent No.: US 8,098,150 B2
(45) Date of Patent: Jan. 17, 2012

(54) METHOD AND SYSTEM FOR LOCATING DEVICES WITH EMBEDDED LOCATION TAGS

(75) Inventors: Ying Zhang, Cupertino, CA (US); James E. Reich, San Francisco, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 408 days.

(21) Appl. No.: 11/807,283

(22) Filed: May 25, 2007

(65) Prior Publication Data

US 2008/0291024 A1    Nov. 27, 2008

(51) Int. Cl.
*G08B 1/00* (2006.01)
(52) U.S. Cl. ............... 340/539.13; 340/10.1; 340/13.26
(58) Field of Classification Search .......... 340/870.01, 340/870.03, 870.18, 870.16, 517, 10.1, 539.13, 340/573.1
See application file for complete search history.

(56) References Cited

U.S. PATENT DOCUMENTS

| | | | |
|---|---|---|---|
| 5,793,630 A * | 8/1998 | Theimer et al. ................. 700/11 |
| 6,046,683 A * | 4/2000 | Pidwerbetsky et al. ....... 340/10.4 |
| 6,084,512 A * | 7/2000 | Elberty et al. ............. 340/572.1 |
| 6,259,406 B1 | 7/2001 | Sugiura et al. ................ 342/457 |
| 6,342,854 B1 * | 1/2002 | Duffett-Smith et al. ...... 342/457 |
| 6,456,239 B1 * | 9/2002 | Werb et al. .................... 342/463 |
| 6,473,038 B2 * | 10/2002 | Patwari et al. ................ 342/450 |
| 6,583,761 B1 | 6/2003 | Angermeier et al. |
| 6,674,403 B2 * | 1/2004 | Gray et al. .................... 342/463 |
| 7,030,761 B2 * | 4/2006 | Bridgelall et al. .......... 340/572.2 |
| 7,081,818 B2 * | 7/2006 | Eckstein et al. ............ 340/572.1 |
| 7,102,537 B2 * | 9/2006 | Inoue et al. .................... 340/903 |
| 7,312,752 B2 * | 12/2007 | Smith et al. ................... 342/464 |
| 7,502,619 B1 * | 3/2009 | Katz ......................... 455/456.5 |
| 2002/0122003 A1 * | 9/2002 | Patwari et al. ............... 342/450 |
| 2003/0119523 A1 * | 6/2003 | Bulthuis ...................... 455/456 |
| 2003/0130793 A1 * | 7/2003 | Patwari et al. ................ 701/300 |
| 2005/0030160 A1 * | 2/2005 | Goren et al. ................. 340/10.5 |
| 2005/0042999 A1 * | 2/2005 | Rappaport ................... 455/307 |
| 2006/0114104 A1 * | 6/2006 | Scaramozzino ............ 340/10.2 |
| 2006/0132352 A1 * | 6/2006 | Schantz et al. ............... 342/125 |
| 2006/0159307 A1 * | 7/2006 | Anderson et al. ............. 382/101 |
| 2007/0247316 A1 * | 10/2007 | Wildman et al. .......... 340/572.4 |
| 2008/0055158 A1 * | 3/2008 | Smith et al. ................... 342/464 |

(Continued)

FOREIGN PATENT DOCUMENTS

DE    19647098 A1    6/1998

OTHER PUBLICATIONS

1998, Abstract of DE19647098.*

(Continued)

*Primary Examiner* — Daniel Wu
*Assistant Examiner* — Rufus Point
(74) *Attorney, Agent, or Firm* — Shun Yao; Park, Vaughan, Fleming & Dowler LLP

(57) ABSTRACT

One embodiment of the present invention provides a system that locates a set of target transmitting mechanism using a mobile sensing infrastructure. During operation, the system determines a reference frame of a sensing mechanism by detecting signals from at least two transmitting mechanisms. The system further determines locations of the target transmitting mechanism relative to the reference frame using the sensing mechanism. In addition, the system produces a result to indicate the locations of the target transmitting mechanisms.

21 Claims, 11 Drawing Sheets

U.S. PATENT DOCUMENTS

| | | | |
|---|---|---|---|
| 2008/0143482 A1* | 6/2008 | Shoarinejad et al. | 340/10.1 |
| 2008/0157970 A1* | 7/2008 | Single et al. | 340/572.1 |
| 2008/0186231 A1* | 8/2008 | Aljadeff et al. | 342/387 |
| 2008/0204322 A1* | 8/2008 | Oswald et al. | 342/465 |
| 2008/0224869 A1* | 9/2008 | Kaplan | 340/572.1 |
| 2008/0252422 A1* | 10/2008 | Dowla et al. | 340/10.1 |

OTHER PUBLICATIONS

Publication: "Mobile-Assisted Localization in Wireless Sensor Networks" by Priyantha et al., IEEE Conference on computer Communications (InfoCom05) 2005, Web: cricket.csail.mit.edu.

Publication: "Simultaneous Localization, Calibration, and Tracking in an Ad Hoc Sensor Network", by C. Taylor et al., $5^{th}$ International Conference on Information Processing in Sensor Networks (IPSN06), 2006.

Publication: "Sensor Fusion Techniques for Cooperative Localization in Robot Teams" by John R. Spletzer, University of Pennsylvania, 2003, pp. 1 to 133.

Publication: "Virtual Ruler: Mobile Beacon Based Distance Measurements for Indoor Sensor Localization", by Chen Wang et al.

Publication: "Node Localization Using Mobile Robots in Delay-Tolerant Sensor Networks" by P. Pathirana et al. IEEE Transactions on Mobile Computing, vol. 4, No. 4, Jul./Aug. 2005.

* cited by examiner

METHOD AND SYSTEM FOR LOCATING DEVICES WITH EMBEDDED LOCATION TAGS

BACKGROUND

1. Field of the Invention

The present disclosure relates to sensing technologies. More specifically, the present disclosure relates to a method and system for locating devices using a mobile sensing infrastructure.

2. Related Art

Various local or indoor positioning systems (LPS) have been developed in recent years. The signal metrics for localization include Radio Signal Strength (RSS), Angle of Arrival (AOA), Time of Arrival (TOA), and Time Difference of Arrival (TDOA). One advantage of RSS-based localization is the low cost of hardware, since most buildings are equipped with wireless local area network (WLAN) with many existing access points (AP), while the disadvantages are its low accuracy (on the order of several meters) and lack of robustness in cluttered environments, the expensive, manual processes of surveying and/or fingerprinting of the environment.

There has been a long history of using ultrasound/acoustic TOA for localization. Ultrasound/acoustic TOA-based localization has better accuracy (approximately 10 cm), but also has relatively short ranges, narrow directionality, and limited robustness in cluttered environments. It is also difficult to produce transmission and receiving sensitivities which are omnidirectional along all three dimensions.

AOA sensors are typically built using a sensor array, i.e., with several receivers arranged in a certain pattern to detect signal phase shifts between them. Therefore, AOA sensors usually cost more than other types of sensor.

Ultra wideband (UWB) technology makes precise indoor localization possible due to its long range (which can extend as far as 100 m) and its high accuracy (on the order of 15 cm). Some UWB systems use TOA or TDOA signals with homogenous nodes. That is, each node has a transmitter and a receiver, and can sense the distance from neighboring nodes within certain range. Other UWB systems may contain two types of nodes: UWB tags and sensors. Tags are UWB transmitters, do not generally have the ability to process data, and generally cannot communicate with each other. Sensors typically include an array of UWB receivers configured to obtain an AOA, consisting of yaw and pitch bearings from the receiver to a tag.

Typically, transmitters can be light and small. AOA sensors, on the other hand, are often heavier and larger. The cost of UWB tags is typically much lower than that of UWB sensors.

In conventional sensing systems, typically a set of fixed, calibrated UWB sensors in precisely known positions detect a mobile tag's signal. The host computer processes the data from UWB sensors and calculates the locations of the mobile tags. In most applications, the UWB sensors are stationary and permanently installed, while the UWB tags are mobile and tracked by the sensors whenever they are within the sensing range of the sensors. However, such a configuration typically requires a number of expensive UWB sensors, and the installation and calibration of these sensors can be very costly.

SUMMARY

One embodiment of the present invention provides a system that locates a set of static target transmitting mechanisms using a mobile sensing infrastructure. During operation, the system determines a reference frame of a sensing mechanism by detecting signals of at least two transmitting mechanisms. The system further determines locations of any other target transmitting mechanisms relative to the reference frame using the sensing mechanism. In addition, the system produces a result to indicate the locations of the target transmitting mechanisms.

In a variation on this embodiment, a transmitting mechanism includes an ultra-wideband transmitter. The sensing mechanism includes one or more ultra-wideband receivers.

In a variation on this embodiment, the sensing mechanism comprises at least two receiver modules placed in pre-determined positions relative to each other. Each receiver module is configured to detect an angle of arrival (AOA) of a signal from a transmitting mechanism.

In a variation on this embodiment, determining the location of target transmitting mechanism involves computing a set of x, y, and z coordinates based on the respective AOA of a signal from the target transmitting mechanism detected by each receiver module in the sensing mechanism.

In a variation on this embodiment, the sensing mechanism can be mobile.

In a further variation, determining the location of the target transmitting mechanism involves relocating the sensing mechanism, so that signals from the target transmitting mechanism and at least one transmitting mechanisms can be detected at the same time, wherein the locations of the at least one transmitting mechanism relative to the reference frame is known.

In a variation on this embodiment, the target transmitting mechanism is attached to an object. The system determines the location of the transmitting mechanism. Further, the system produces a result to indicate a dimension and/or location of the object based on the location of the transmitting mechanism attached to the object.

In a further variation, determining the location of each of the additional transmitting mechanism involves detecting simultaneously a signal from at least one transmitting mechanism the location of which relative to the reference frame have been determined.

In a variation on this embodiment, the target transmitting mechanism is attached to an object. Furthermore, the result produced indicates the location of the object.

In a variation on this embodiment, the system uses a number of measurements of the AOA data from the set of transmitting mechanisms, and refines the locations of the transmitting mechanisms based on the measurements.

In a variation on this embodiment, the system uses the transmitting mechanisms as a location infrastructure to track mobile sensors after the transmitting mechanisms are localized.

Figure 1:
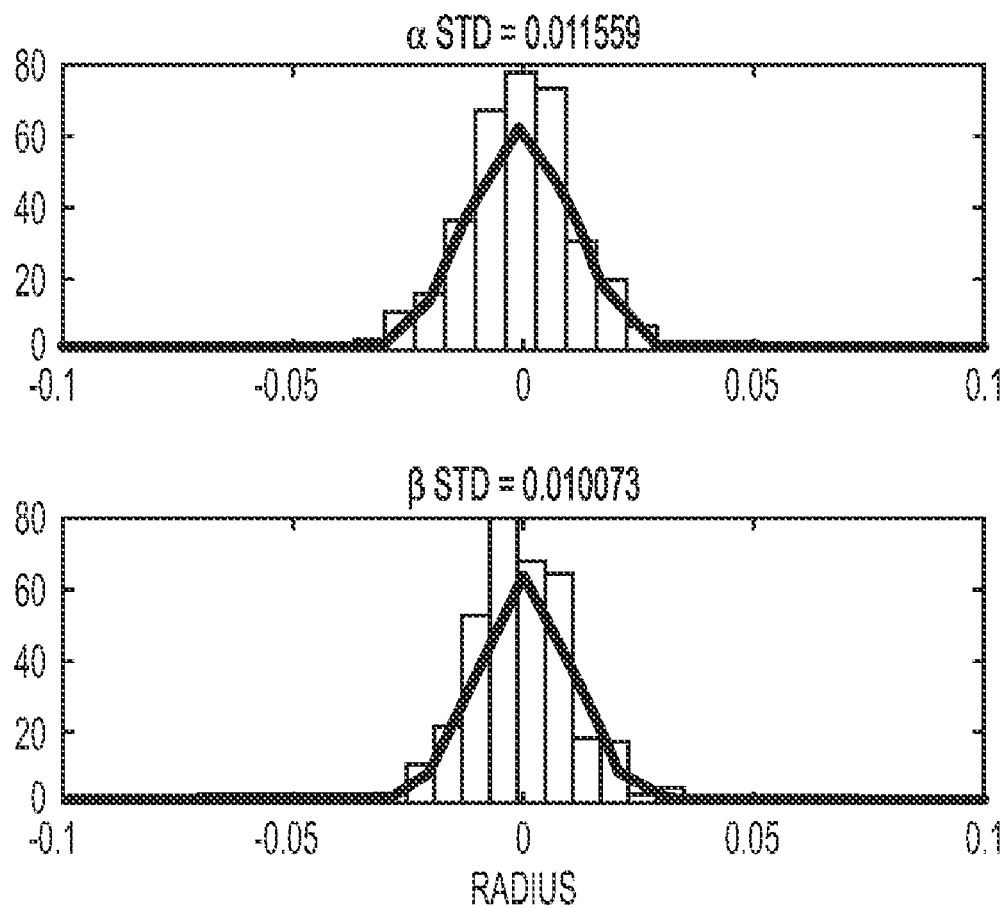
FIG. 1 illustrates a histogram of error distributions of yaw and pitch with respect to their mean values for a fixed pair of sensor and tag in accordance with one embodiment of the present invention.

TABLE I presents a pseudo code for the leap frog computation in accordance with one embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Overview

Embodiments of the present system provide a system that localizes tags from a mobile UWB sensor base. This arrangement reduces the infrastructure cost of building a smart space or can be used as disposable ad-hoc deployment of location systems for emergency response in disastrous environments. Such a system also better protects the user's privacy (the computation of locations at the user's end) and can obtain orientations of the sensor in addition to 3D positions (a useful feature for hand-held cameras). The static tags can be standalone, or embedded into devices (such as RFID, lights and switches, etc.) so that the locations of these devices are obtained (rather than measured and entered the system by hand) to facilitate management and to provide location-based services. The mobile sensor base and non-embedded tags can be reused for localizing tags in other spaces.

The mobile base includes at least two sensors mounted in fixed positions relative to each other. In one embodiment, both sensors have faces aligned in a vertical plane; there is a fixed distance between them and both have zero pitch and roll angles. The base can move in a 2D plane: X, Y, yaw. Vertical motion in Z direction is also possible and is useful if sensors are vertically positioned. In one embodiment, the mobile base also has a host computer and an Ethernet switch, through which both the sensors and the host computer are coupled. To localize tags, the mobile base is moved around in the space of tags, and AOA data between the tags and sensors are obtained over time. Note that only subsets of the tags need to be sensed simultaneously.

Conventional mobile-assisted localization (MAL) systems rely on distance rather than angle inputs. Embodiments of the present invention exploit constraints of AOA between sensors and tags, which result in closed-form solutions. The uniqueness of this system, compared with other MAL systems, in addition to the use of AOA data and asymmetric tag/sensor combination, is the structured mobile platform (two sensors in a fixed position) and constrained motion of the platform (four instead of six degrees of freedom).

Data Characterization

In order to understand the noise characteristics of the detected UWB data, a series of experiments have been conducted. Embodiments of the present invention provide a robust data extraction mechanism that operates with a continuous source of input data.

We first study the horizontal (yaw: $\alpha$) and vertical (pitch: $\beta$) angle variations given a static pair of a sensor and a tag. A sensor and a tag are placed in a fixed position, and AOA data is collected in a given time period. Although details depend on the relative positions of the sensor and the tag, it is observed that the error distributions for yaw and pitch with respect to the mean are very similar.

FIG. 1 illustrates a histogram of error distributions of yaw ($\alpha$) and pitch ($\beta$) with respect to their mean values for a fixed pair of sensor and tag in accordance with one embodiment of the present invention. The standard deviations are between 0.01 and 0.03 radius for both yaw and pitch angles in the experiments. Such a distribution does not seem to be affected by distance or angles, although angles approaching the boundary of the valid range (about ±1.2 radius in yaw and ±1.0 in pitch) may result in unstable readings. In one embodiment, data with large angle readings are filtered out, so the system can be more robust.

Figure 2:
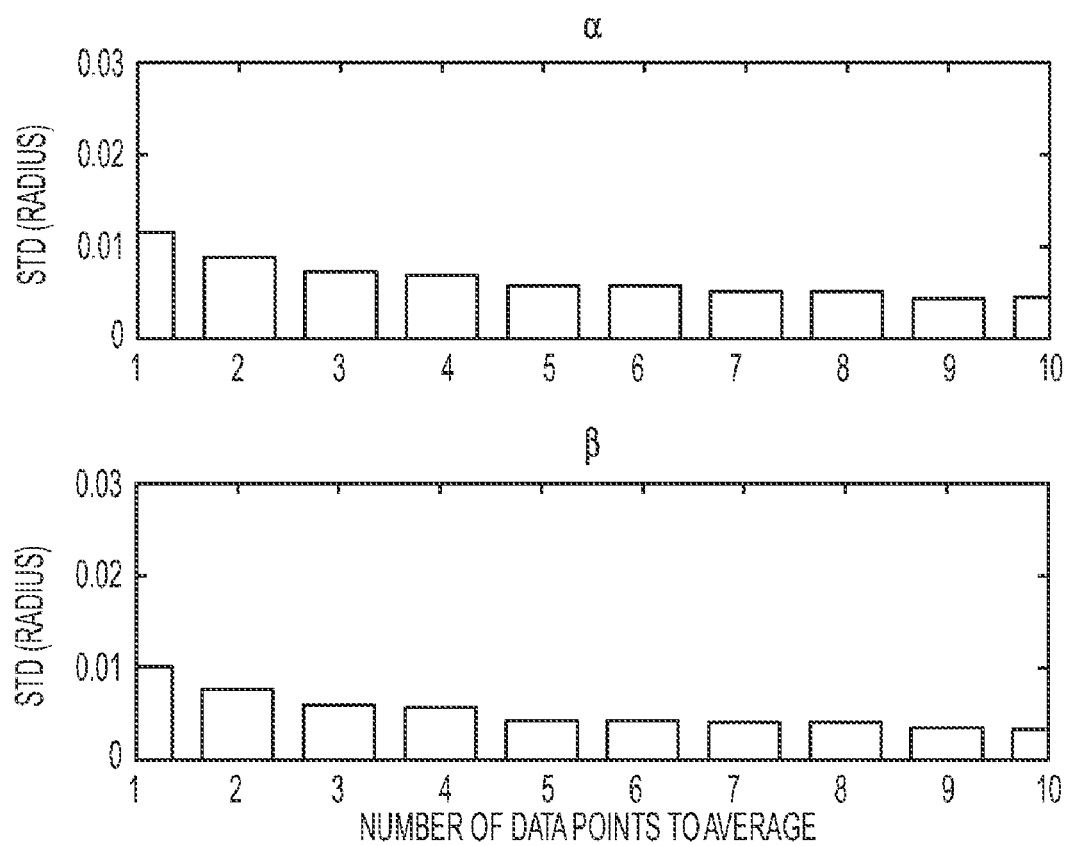
FIG. 2 illustrates the effect of averaging on standard deviations of angle errors in accordance with one embodiment of the present invention.

To reduce variations in angle readings, the system averages multiple data readings from a tag's stable position. FIG. 2 illustrates the effect of averaging on standard deviations of angle errors in accordance with one embodiment of the present invention. The standard deviation after averaging n points is shown. It is clear that 3 to 5 readings are sufficient. Note that a larger n may not help reduce errors further.

The AOA input to our algorithm is a continuous series of data points, with each entry the following information is collected: timeslot, sensor, tagID, $\alpha$, $\beta$. timeslot is the timeslot in which the data is collected (in one embodiment, one slot is about 1/40 seconds). sensor and tagID indicate from which pair of UWB sensor and tag the data is collected, respectively. $\alpha$ and $\beta$ are the pitch and yaw angles, respectively. Although in a stable position the angle variations are small in general, the readings can be less reliable when sensors are moving. It is important to detect a set of stationary points from a continuous input, where the data are relatively stable.

In one embodiment, the system segments the input data so that consecutive data points with both α and β variations less than ε are grouped. Only groups with the number of data points more than N are kept. In one embodiment, the system sets ε=0.05 and N=5. Each group has a starting timeslot s and ending timeslot e, and an average α and β in the period of [s, e].

Figure 3:
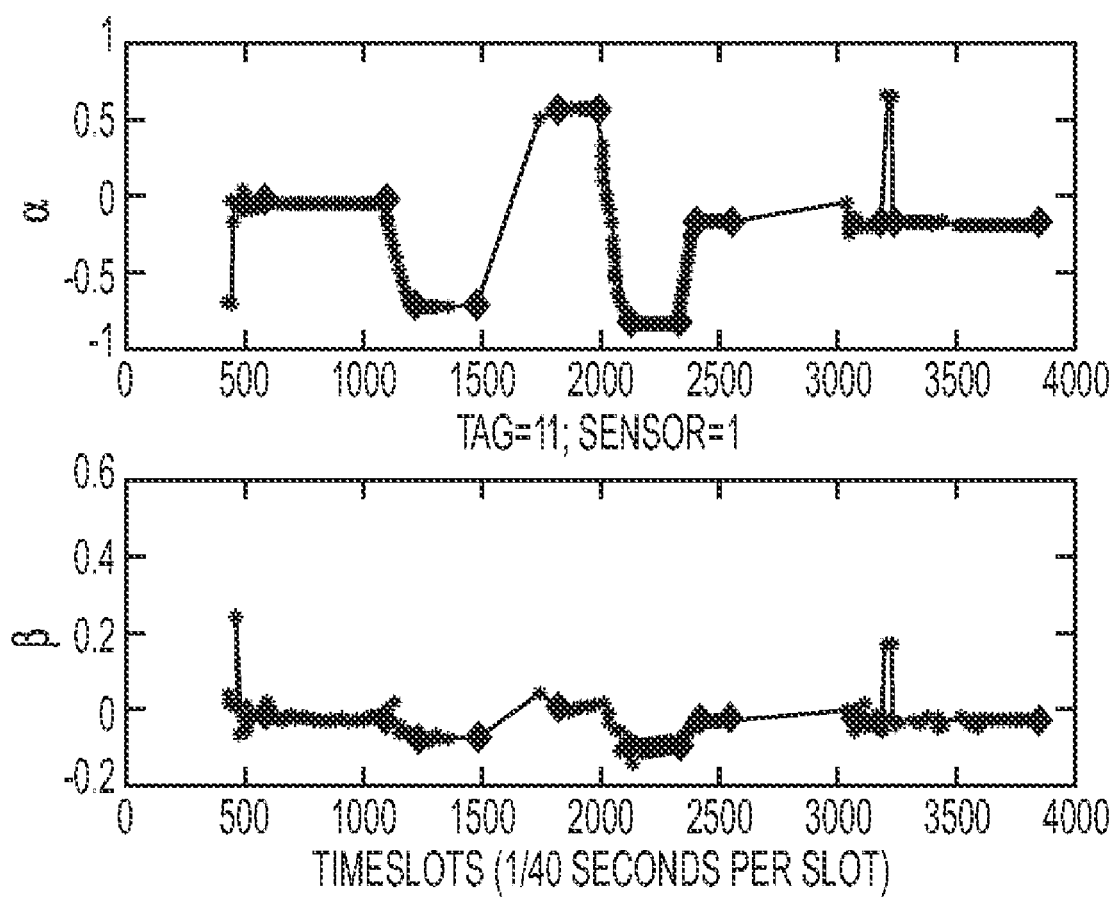
FIG. 3 illustrates the original (star) and grouped (diamond) data points for a sensor/tag pair in accordance with one embodiment of the present invention.

FIG. 3 illustrates the original (star) and grouped (diamond) data points for a sensor/tag pair in accordance with one embodiment of the present invention. Note that in this figure some isolated bad points are removed by the system.

Figure 4:
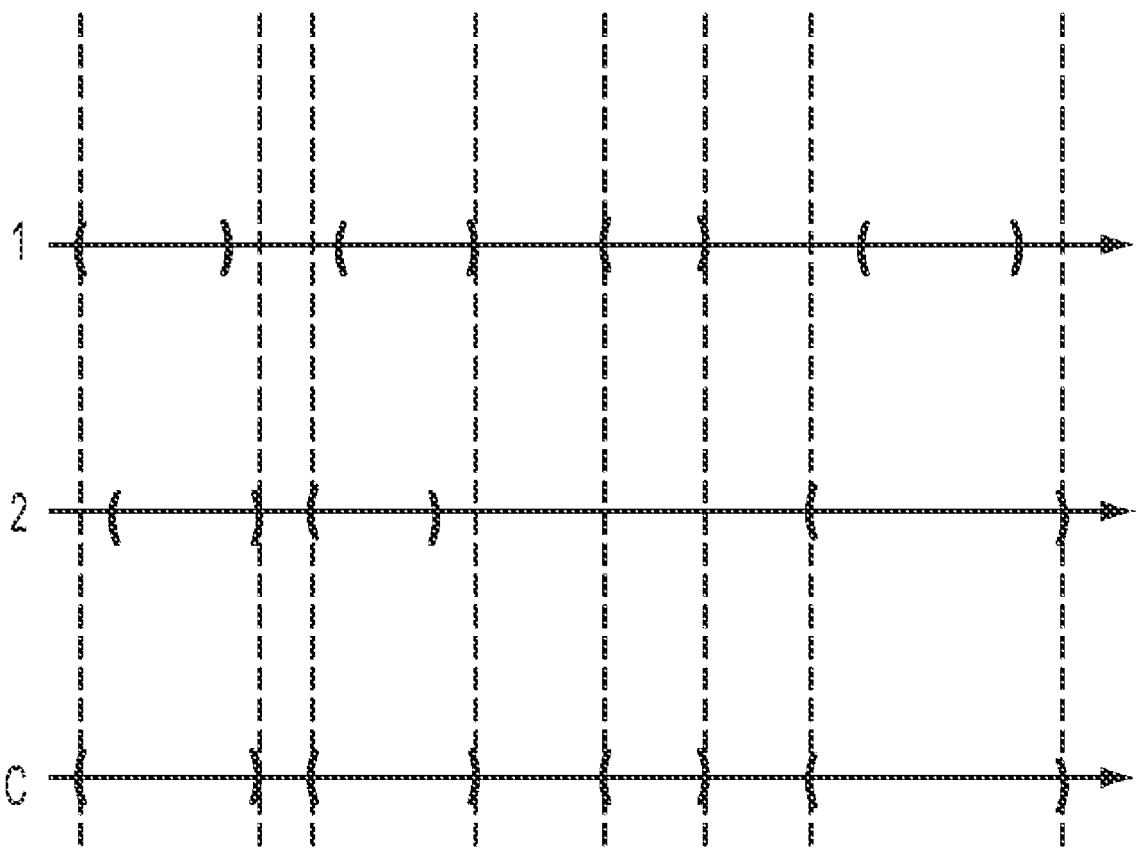
FIG. 4 presents a time diagram illustrating the process of obtaining common data points from two separate sources in accordance with one embodiment of the present invention.
Figure 5:
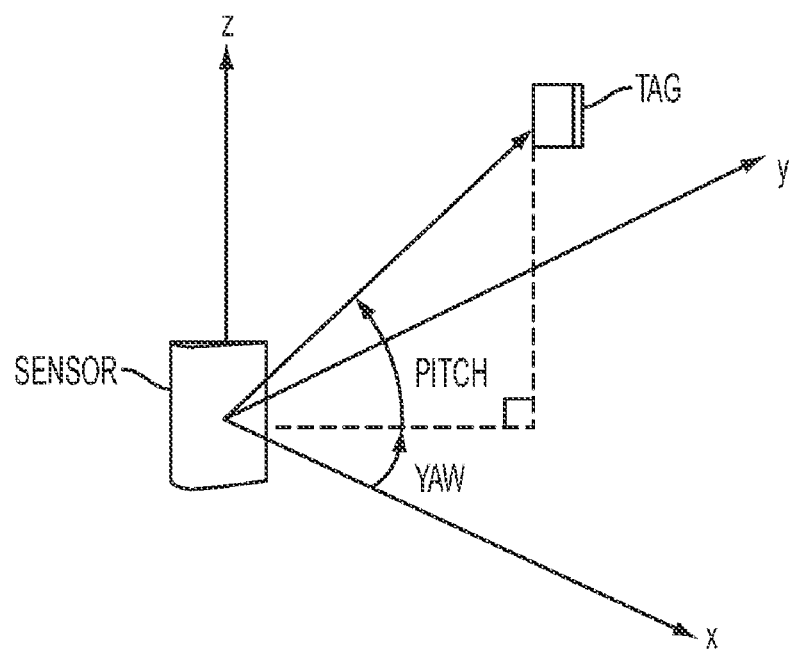
FIG. 5 illustrates a local reference frame for a sensor and AOA of a tag in accordance with one embodiment of the present invention.

After grouping data points for each tag/sensor pair, the next step is to find a common set of data points consistent for all tag/sensor pairs. Such a set of points corresponds to the set of stationary positions in the trajectory of the mobile sensor platform. Let the start and end time of a period associate with a left and right parenthesis, respectively. The system first orders all the parenthesis along the time line and then searches for periods with balanced left and right parenthesis. FIG. 4 presents a time diagram illustrating the process of obtaining common data points from two separate sources in accordance with one embodiment of the present invention. Note that it is possible that not all sources have data at a given time period.

After obtaining the set of data points corresponding to the set of stationary points of the mobile platform, the system can obtain two angle matrices, α and β, where α(i,j,k) and β(i,j,k) are the angles of yaw and pitch, respectively, from tag i to sensor j at k'th time period. If tag i is out of range of sensor j at time k, α(i,j,k) and β(i,j,k) are set to be inf. The α and β matrices are the input to the localization computation described in the next section.

Localization Computation

Sensor/Tag Locations and AOA

Each sensor has six degrees of freedom in space: $x_s$, $y_s$, $z_s$, a, b, r where $x_s$, $y_s$, $z_s$ are the 3D coordinates and a, b, r are yaw, pitch and roll angles, respectively. In one embodiment, it is assumed that r=0 and tags are omnidirectional with $x_t$, $y_t$, $z_t$ locations. Each sensor has its own reference frame, which is within the range of detection of a sensor. The position of a tag in a sensor's reference frame uniquely determines the AOA: yaw and pitch (see FIG. 4). A tag/sensor pair introduces two equations. Let $x_t^s$, $y_t^s$, $z_t^s$ be the location coordinates of a tag in the sensor's reference frame, and let α and β are yaw and pitch angles, respectively:

$$x_t^s \sin(\alpha) - y_t^s \cos(\alpha) = 0 \quad (1)$$

$$x_t^s \sin(\beta) - z_t^s \cos(\beta)\cos(\alpha) = 0 \quad (2)$$

Given a sensor's position $x_s$, $y_s$, $z_s$, a, b, and a tag's position $x_t$, $y_t$, $z_t$, in a global reference frame, the tag's position within the sensor's reference frame, $x_t^s$, $y_t^s$, $z_t^s$, can be obtained by:

$$\begin{pmatrix} x_t^s \\ y_t^s \\ z_t^s \\ 1 \end{pmatrix} = \begin{bmatrix} T' & -T'\begin{pmatrix} x_s \\ y_s \\ z_s \end{pmatrix} \\ 0 \ 0 \ 0 & 1 \end{bmatrix} \begin{pmatrix} x_t \\ y_t \\ z_t \\ 1 \end{pmatrix} \quad (3)$$

where T is the rotational transformation matrix for the sensor frame:

$$\begin{bmatrix} \cos(a)\cos(b) & -\sin(a) & \cos(a)\sin(b) \\ \sin(a)\cos(b) & \cos(a) & \sin(a)\sin(b) \\ -\sin(b) & 0 & \cos(b) \end{bmatrix} \quad (4)$$

Using these of equations, one can compute a tag's location $x_t$, $y_t$, $z_t$ given the AOA data from two sensors with known locations (four equations, three unknowns). Or one can compute a sensor's orientation (yaw and pitch) given the AOA data from a fixed-location tag (two equations, two unknowns).

Figure 6:
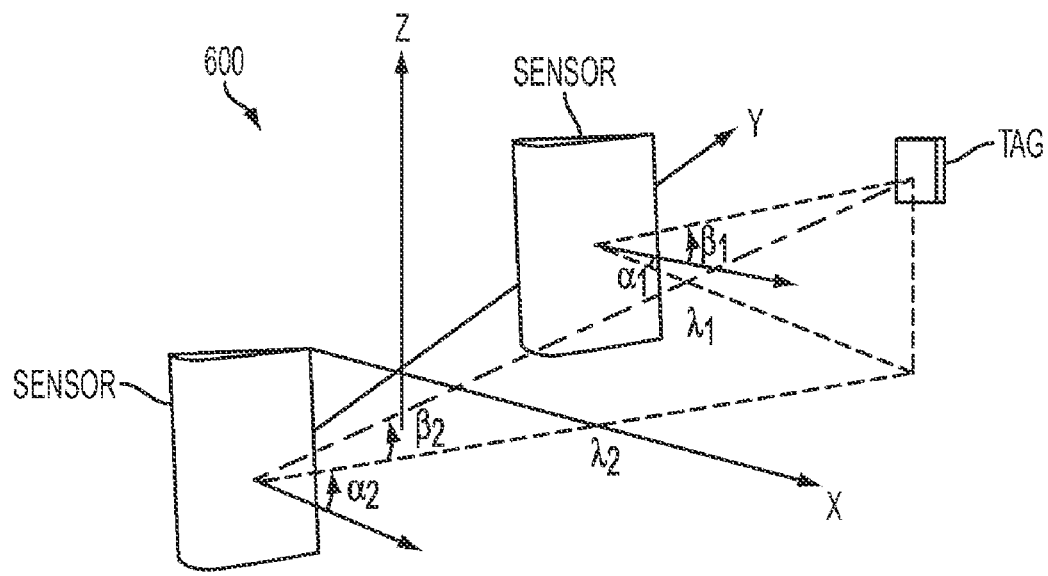
FIG. 6 illustrates a two-sensor platform 600 with a local frame in the center between the sensors in accordance with one embodiment of the present invention.

One problem an embodiment of the present invention aims to solve is to localize a set of static tags in 3D space. At least two sensors are mounted on a mobile cart in fixed positions relative to each other. In one embodiment, (see FIG. 6), two sensors are used. The distance between the two sensors is fixed. The cart can move with four degrees of freedom, x, y, z and yaw a. At each cart position, usually only a subset of tags can be "seen" by the sensors. However, it is assumed that each tag can be seen by the sensors at least once at some cart position. Hence, the system can obtain a rough estimate of how many cart positions are needed for tag localization as follows.

Let the first cart position be the global reference frame. Each new cart position adds four unknowns. If k tags can be "seen" at a cart position, 4k more equations are added. Let n be the total number of tags and m be the number of extra cart positions. There are 3n+4m unknowns and 4k(m+1) equations. One may solve the set of equation for the unknowns if $$4k(m+1) \geq 3n + 4m. \quad (5)$$

The number of cart positions is only one factor for solving the equations. Another factor is the connectivity of the overall tag/sensor pairs. Note that in this disclosure, "being connected" is used in a graph-theory sense, and does not necessarily mean being physically contacting. Here, a tag is considered connected to a sensor at a position if it can be seen by the sensor at that position.

There are 2(m+1) sensor nodes and n tag nodes for m positions and n tags, which constitute a bipartite graph. Such a graph has to be at least connected to have all coordinates in the same reference frame. For example, if three tags are seen by the sensors in the first cart position, and a totally different three sensors are seen by the sensors in the second cart position, one cannot obtain the six tag locations in one reference frame, although 4×3×2≥3×6+4. Let c≥1 be the minimum number of tags in common for a new location. Given n tags and at most k tags can be seen at a time, ideally the following inequality is met:

$$k + (k-c)m \geq n. \quad (6)$$

In the previous example, we have 3+(3−1)<6.

Given the input data α and β, the system first filters out "bad" cart positions. A cart position is "bad" if it has no more than two tag connections. The system removes such cart positions since each position adds four variables and one pair of sensor/tag connection adds two equations. A "good" cart position, in contrast, adds at least as many equations as variables.

Closed-Form Solutions

We can plug the data α and β into the equations (1)-(4) in the previous section, and use a nonlinear solver to find the solution. However, since the constraints are nonlinear and the size of the problem is large (4k+3n variables for k positions and n tags), one may not find the solution in practice. However, due to the special configuration of the sensor platform, the system can obtain a complete or partial solution using a set of linear equations. The procedure includes two components: from sensors to tags, and from tags to sensors.

From Sensors to Tags

Figure 7:
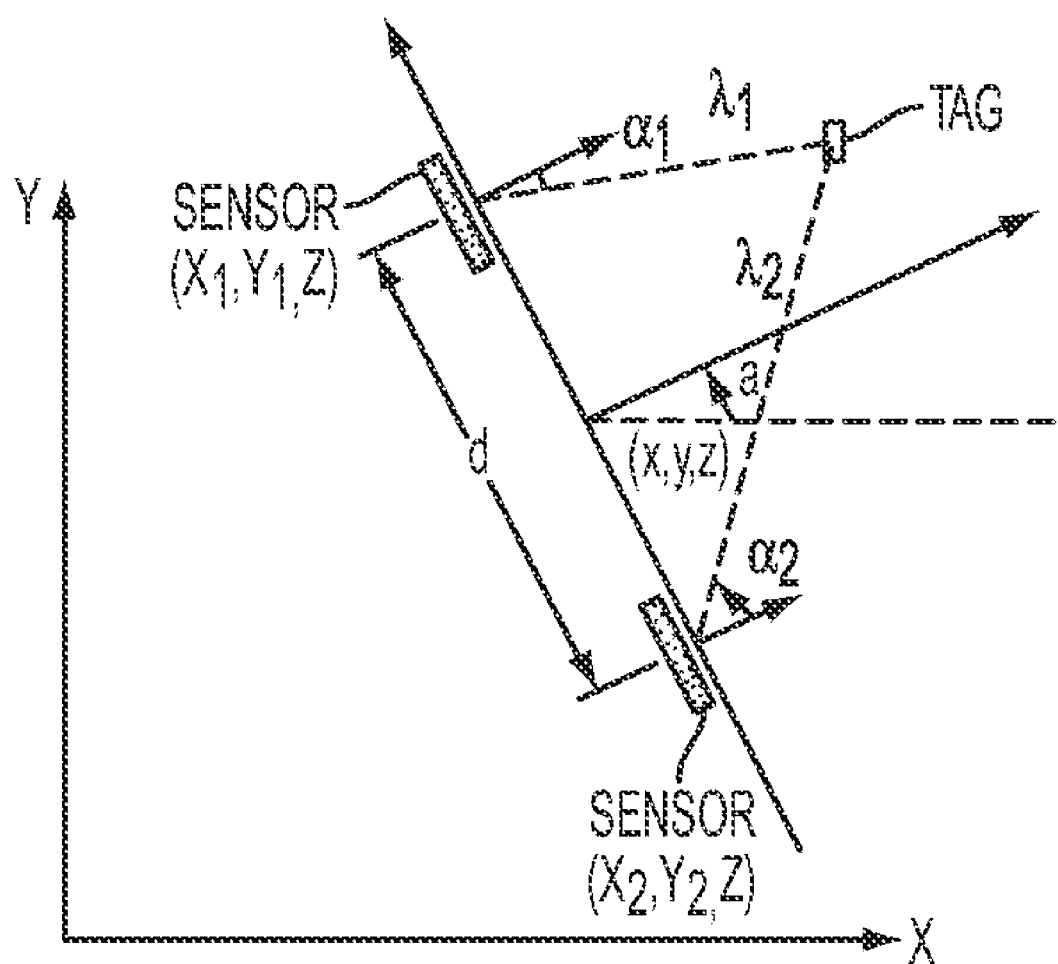
FIG. 7 illustrates a 2D projection of the two-sensor platform 600 in accordance with one embodiment of the present invention.

In the two-sensor embodiment, given a position of the two sensor frame (see FIG. 7), x, y, z, a, the two sensor locations are $x_1$, $y_1$, $z_1$ a and $x_2$, $y_2$, z, a, respectively, with $x_1$=x+d sin(a)/2, $y_1$=y−d cos(a)/2 and $x_2$=x−d sin(a)/2 and $y_2$=y−d cos(a)/2 where d is the distance between the two sensors.

Let $\lambda_1$ and $\lambda_2$ be distances from a tag to the two sensors in the XY plane, respectively, we have $$x_1 = x_1 + \lambda_1 \cos(\alpha_1 + a) \quad (7)$$

$$y_1 = y_1 + \lambda_1 \sin(\alpha_1 + a) \quad (8)$$

$$x_1 = x_2 + \lambda_2 \cos(\alpha_2 + a) \quad (9)$$

$$y_1 = y_2 + \lambda_2 \sin(\alpha_2 + a). \quad (10)$$

From $$\lambda_1 \cos(\alpha_1 + a) - \lambda_2 \cos(\alpha_2 + a) = x_1 - x_2 = d \sin(a)$$

$$\lambda_1 \sin(\alpha_1 + a) - \lambda_2 \sin(\alpha_2 + a) = y_1 - y_2 = -d \cos(a)$$

one can solve for $\lambda_1$ and $\lambda_2$. Plugging these values in Eq. (7) and (9), we have $$x_t = \frac{1}{2}(x_1 + \lambda_1 \cos(\alpha_1 + a)) + (x_2 + \lambda_2 \cos(\alpha_2 + a))$$

and $$y_t = \frac{1}{2}(y_1 + \lambda_1 \sin(\alpha_1 + a)) + (y_2 + \lambda_2 \sin(\alpha_2 + a)).$$

Using equations $$z_t = z_1 + \lambda_1 \tan(\beta_1)$$

$$z_t = z_2 + \lambda_2 \tan(\beta_2),$$

we have $$z_t = z + \frac{1}{2}(\lambda_1 \tan(\beta_1) + \lambda_2 \tan(\beta_2)).$$

This approach can be extended to systems with greater numbers of sensors and/or different sensor placements using similar techniques.

From Tags to Sensors

In the two-sensor configuration, if the pair of sensors can see a couple of tags with known positions, the sensor frame position x, y, z, a can be obtained. Let $\alpha_{ik}$ and $\beta_{ik}$ be yaw and pitch angles from tag i to sensor k, respectively; and let $\lambda_{ik}$ be the projected distance from tag i to sensor k on the XY plane. If a tag i can be seen by both sensors, we have $$-\lambda_{i1} \sin(\alpha_{i1}) + \lambda_{i2} \sin(\alpha_{i2}) = d$$

$$\lambda_{i1} \cos(\alpha_{i1}) - \lambda_{i2} \cos(\alpha_{i2}) = 0$$

The system can compute $\lambda_{i1}$ and $\lambda_{i2}$. Given a pair of tags i and j, and a sensor at $x_k$, $y_k$, $z_k$, a, where k=1 or 2, we have $$x_k = x_i - \lambda_{ik} \cos(\alpha_{ik} + a) \quad (11)$$

$$y_k = y_i - \lambda_{ik} \sin(\alpha_{ik} + a) \quad (12)$$

$$x_k = x_j - \lambda_{jk} \cos(\alpha_{jk} + a) \quad (13)$$

$$y_k = y_j - \lambda_{jk} \sin(\alpha_{jk} + a) \quad (14)$$

and $$x_j - x_i - \lambda_{ik} \cos(\alpha_{ik} + a) + \lambda_{jk} \cos(\alpha_{jk} + a) = 0 \quad (15)$$

$$y_j - y_i - \lambda_{ik} \sin(\alpha_{ik} + a) + \lambda_{jk} \sin(\alpha_{jk} + a) = 0. \quad (16)$$

(15)·cos(a)+(16)·sin(a) produces:

$$(x_i - x_j)\sin(a) - (y_i - y_j)\cos(a) = -\lambda_{ik}\sin(\alpha_{ik}) + \lambda_{jk}\sin(\alpha_{jk}).$$

If a sensor sees n tags, there are 2(n−1) linear equations with two variables cos(a) and sin(a). When n≥2, once can solve the set of linear equations and obtain cos(a) and sin(a). Therefore, $$a = \arctan\left(\frac{\sin(a)}{\cos(a)}\right).$$

Using Eq. (11) and (12) for each tag i, we have $$x_1^i = x_i - \lambda_{i1} \cos(\alpha_{i1} + a)$$

$$y_1^i = y_i - \lambda_{i1} \sin(\alpha_{i1} + a)$$

$$x_2^i = x_i - \lambda_{i2} \cos(\alpha_{i2} + a)$$

$$y_2^i = x_i - \lambda_{i2} \sin(\alpha_{i2} + a)$$

and $$z_1^i = z_i - \lambda_{i1} \tan(\beta_{i1}).$$

$$z_2^i = z_i - \lambda_{i2} \tan(\beta_{i2})$$

Therefore, the estimated locations for sensors 1 and 2 seeing n tags are $$\left(\frac{1}{n}\sum_{i=1}^{n} x_1^i, \frac{1}{n}\sum_{i=1}^{n} y_1^i, \frac{1}{n}\sum_{i=1}^{n} z_1^i\right) \text{ and } \left(\frac{1}{n}\sum_{i=1}^{n} x_2^i, \frac{1}{n}\sum_{i=1}^{n} y_2^i, \frac{1}{n}\sum_{i=1}^{n} z_2^i\right),$$

respectively. The center of the sensor frame is at $$\left(\frac{x_1 + x_2}{2}, \frac{y_1 + y_2}{2}, \frac{z_1 + z_2}{2}\right).$$

This approach can be extended to systems with greater numbers of sensors or different sensor placements using similar techniques.

Leapfrog Computation

Let the first cart position be the reference frame, the leapfrog computation alternates the computation of tags positions and cart positions, until all the locations are obtained. The pseudo code is shown in shown in Table 1.

TABLE I

Inputs:
    $\alpha_{ijk}$, $\beta_{ijk}$: angles from tag i to sensor j at time k
Outputs:
    $x_i$, $y_i$, $z_i$: locations for all tags;
    $x_k$, $y_k$, $z_k$, $a_k$: positions of the mobile sensor frame;

TABLE I-continued

```
Notations:
    k: current sensor frame
    kTs: the set of tags with known locations
    cTs: the set of tags connected to the current sensor frame
Initialization:
    k ← 1: the first sensor frame is the reference frame
    kTs ← 0: all tags are unknown position
0. while there is a sensor frame k:
    1. Let cTs
        be the set of tags connect to frame k;
    2. Let cnTs ← cTs\kTs
        be the set of connected tags with unknown locations
    3. Compute tag locations for each tag in cnTs
        using the closed-form solution in Section III-B.1
    4. kTs ← kTs ∪ cnTs
    5. Let k be the next unknown sensor frame
        with the maximum connections to known tags
    6. Compute the position of the sensor frame
        using the closed-form solution in Section III-B.2
    7. end while
```

Optimization-Based Computation

One embodiment of the present invention employs optimization-based computations to minimize the least-square errors for all equations.

Let $e_k=0$ be an equation from one tag/sensor pair. One can minimize $\frac{1}{2}\Sigma_k e_k^2$ for all tag/sensor pairs. In one embodiment, the system uses the constrained optimization, where constraints are ranges for locations ([−bound, bound]) and angles [−π,π]).

The system can adopt two variations of this approach. The first variation (denoted as "LSLeapfrog") involves applying the optimization procedure at each of the leapfrog steps, i.e., at each step, from sensors to tags or from tags to sensors, using the closed-form solution first and then applying the least-squares minimization with the closed-form solution as the initial value. The second variation (denoted as "LeapfrogLS") uses the original leapfrog solution as the initial value for least-squares minimization of all equations.

Figure 8:
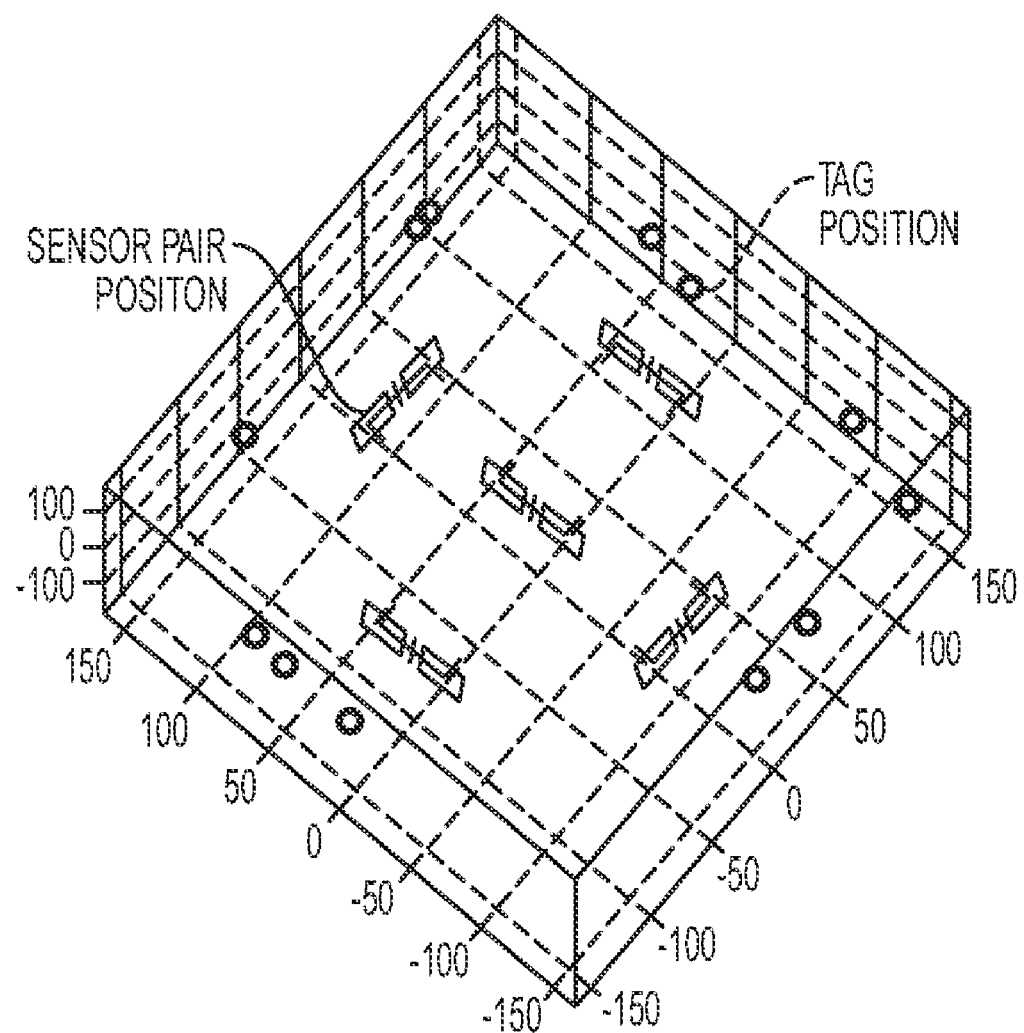
FIG. 8 illustrates a number of tags distributed on walls in accordance with one embodiment of the present invention.
Figure 9:
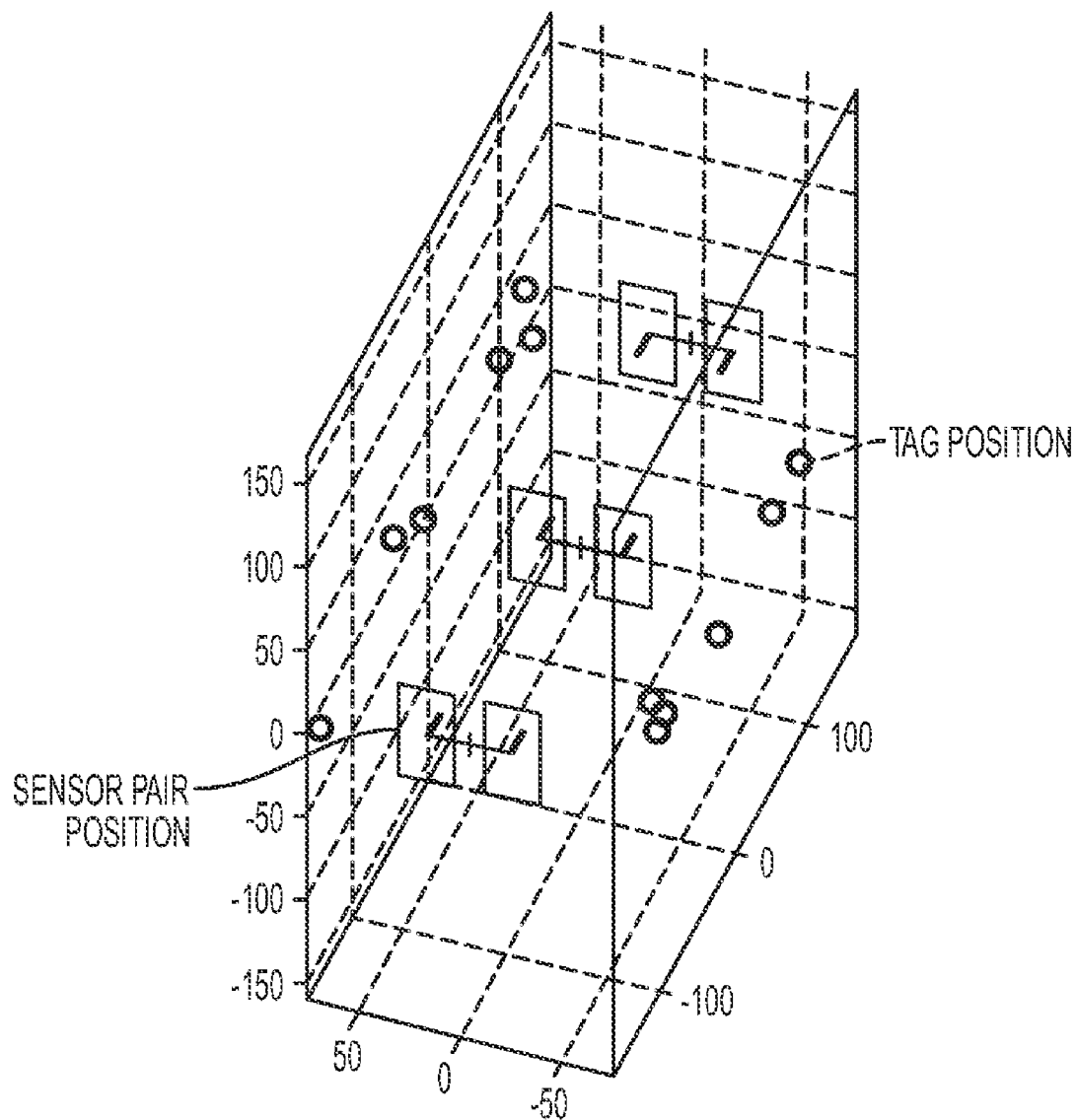
FIG. 9 illustrates a number of tags distributed along a hallway in accordance with one embodiment of the present invention.

The following examples illustrate the localization performance in two scenarios: (1) Wall: tags are put on four walls of a room, and (2) Hallway: tags are distributed along two walls of a narrow hallway. A total of 12 tags are used, in an area bounded by [−150,150]. FIGS. 8 and 9 show the wall and hallway scenarios, respectively.

The distance between the pair of sensors are assumed to be 25 or 40, and the angle noise is added by a uniform distribution in [−m, m] where m is 0, 0.01 or 0.02.

The three computation methods presented in the previous section are compared in terms of average tag location accuracy. The estimation error for one tag is the distance between the true and estimated locations. The location accuracy is the average estimation errors for all tags.

Figure 10:
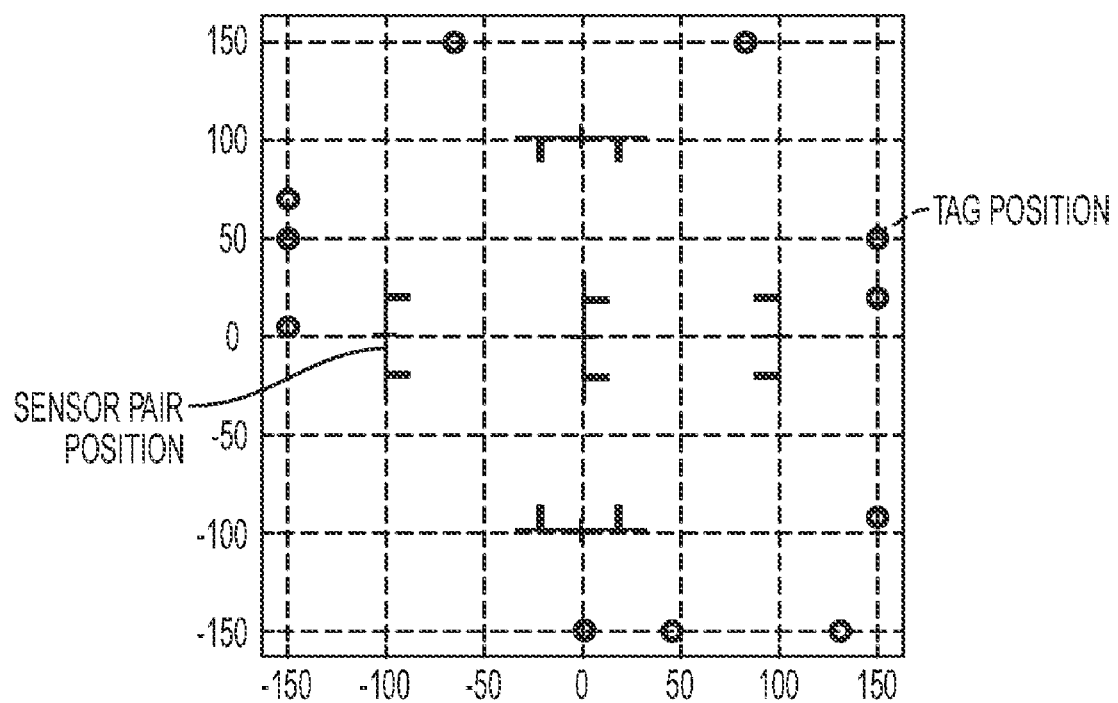
FIG. 10 illustrates a 2D projection of a number of wall tags in accordance with one embodiment of the present invention.
Figure 11:
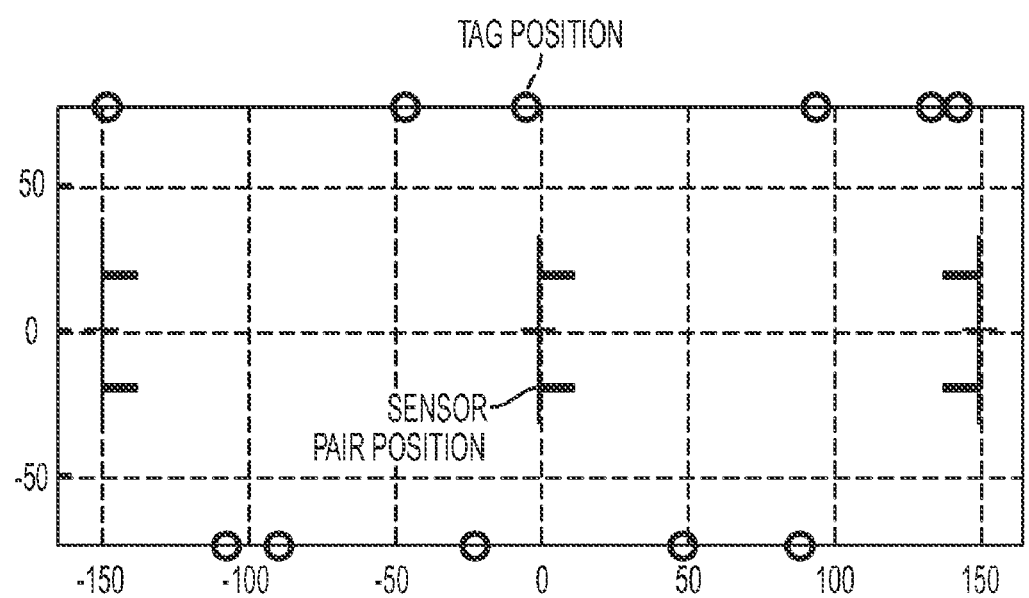
FIG. 11 illustrates a 2D projection of a number of hallway tags in accordance with one embodiment of the present invention.

FIGS. 10 and 11 show the 2D projections of these two cases (where the noise is 0.02 and the distance between two sensors is 40) and the results of using LeapfrogLS.

Application and Implementation

In one embodiment, a user can attach one or more tags to an object and use the aforementioned system to localize the tags. Based on the localization information of the tags, the user can then obtain the dimension and/or location information of the object. Note that there is not limitation with respect to the size and location of the object, so long as the initial reference frame of the sensor system is calibrated properly. For example, the object can be a lamp, a piece of equipment, or a building.

In further embodiments, one can use the tags the locations of which have been determined as an infrastructure to detect the location of mobile sensors. That is, a number of fixed tags form a reference frame, and by detecting the relative position of the mobile sensors to the fixed tags, one can determine the location of the sensors.

Figure 12:
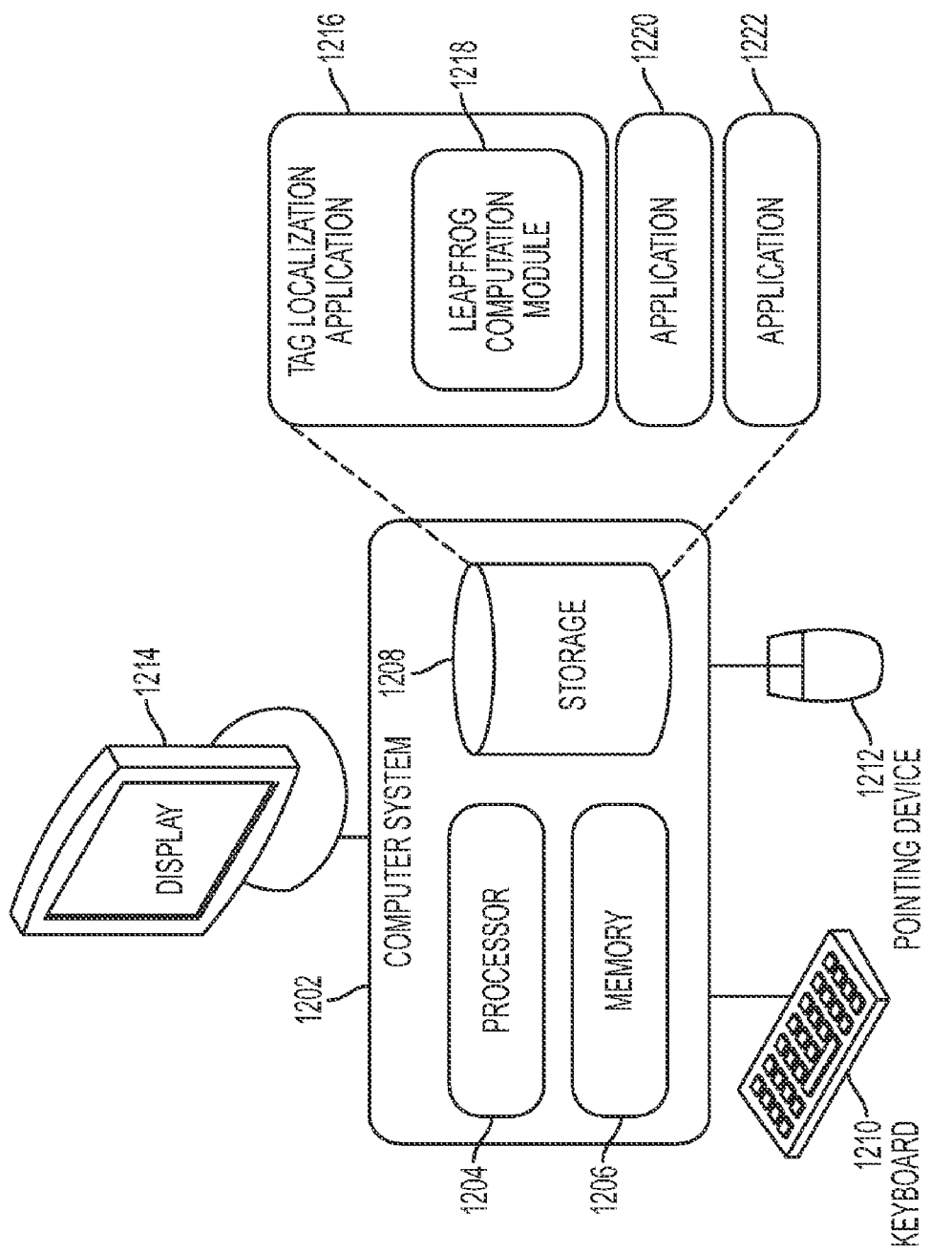
FIG. 12 illustrates an exemplary computer system that facilitates locating of devices with embedded location tags in accordance with one embodiment of the present invention.

FIG. 12 illustrates an exemplary computer system that facilitates locating of devices with embedded location tags in accordance with one embodiment of the present invention. A computer system 1202 includes a processor 1204, a memory 1206, and a storage device 1208. Computer system 1202 is also coupled to a display 1214, a keyboard 1210, and a pointing device 1212.

Storage device 1208 stores a tag localization application 1216, and applications 1220 and 1222. In addition, tag localization application 1216 contains a Leapfrog computation module 1218, which performs the Leapfrog computation to determine the locations of a plurality of tags. During operation, tag localization module 1216 is loaded into memory 1206 and executed by processor 1204. Note that computer system 1202 can be coupled to the Internet, through which the tag-location information can be shared among different computer systems.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for locating a set of target transmitting mechanisms using a mobile sensing infrastructure, the method comprising:
    detecting signals, at two receiver modules, each of which comprises a sensor, of a mobile sensing mechanism, from at least two reference transmitting mechanisms, each of which comprises a tag coupled to a device to be localized, wherein the two receiver modules are placed in fixed positions relative to each other on a mobile base that moves within four degrees of freedom;
    determining a reference frame of the receiver modules on the mobile base of the mobile sensing mechanism based on the signals detected from the reference transmitting mechanisms over a time period when the mobile sensing mechanism moves within the four degrees of freedom;
    determining locations of other target transmitting mechanisms, relative to the reference frame using the receiver modules on the mobile base of the sensing mechanism; and
    indicating the locations of the target transmitting mechanisms.

2. The method of claim 1,
    wherein a transmitting mechanism includes an ultra-wideband transmitter; and
    wherein the sensing mechanism includes at least two ultra-wideband receivers.

3. The method of claim 1,
    wherein each receiver module is configured to detect an angle of arrival (AOA) of a signal from a transmitting mechanism.

4. The method of claim 3,
    wherein determining the location of a target transmitting mechanism comprises computing a set of x, y, and z coordinates based on the respective AOA of a signal from the target transmitting mechanism detected by each receiver module in the sensing mechanism.

5. The method of claim 4,
wherein determining the location of the target transmitting mechanism comprises relocating the sensing mechanism so that signals from the target transmitting mechanism and at least one transmitting mechanism can be detected at the same time, wherein the locations of the at least one transmitting mechanism relative to the reference frame has been determined.

6. The method of claim 1,
wherein the target transmitting mechanism is attached to an object; and
wherein the method further comprises:
determining the location of the target transmitting mechanism; and
producing a result to indicate a dimension and location of the object based on the location of the transmitting mechanism attached to the object.

7. The method of claim 6,
wherein determining the location of each of the additional transmitting mechanism comprises detecting simultaneously a signal from at least one transmitting mechanism the location of which relative to the reference frame has been determined.

8. The method of claim 1,
wherein the target transmitting mechanism is attached to an object; and
wherein the determined location of the target transmitting mechanism indicates a location of the object.

9. The method of claim 1, further comprising:
using a number of measurements of the AOA data from the set of target transmitting mechanisms; and
refining the locations of the target transmission mechanisms based on the measurements.

10. The method of claim 1, further comprising using the transmitting mechanisms as a location infrastructure to track mobile sensors after the transmitting mechanisms are localized.

11. A system for locating a set of target transmitting mechanisms using a mobile sensing infrastructure, the system comprising:
a mobile sensing mechanism that includes two receiver modules, each of which comprises a sensor, configured to:
detect signals from at least two reference transmitting mechanisms, each of which comprises a tag coupled to a device to be localized, wherein the two receiver modules are placed in fixed positions relative to each other on a mobile base that moves within four degrees of freedom;
determine a reference frame of the receiver modules on the mobile base of the mobile sensing mechanism based on the signals detected from the reference transmitting mechanisms over a time period when the mobile sensing mechanism moves within the four degrees of freedom; and
determine locations of other target transmitting mechanisms, relative to the reference frame using the receiver modules on the mobile base of the sensing mechanism; and
a indication mechanism configured to indicate the locations of the target transmitting mechanisms.

12. The system of claim 11,
wherein a transmitting mechanism includes an ultra-wideband transmitter; and
wherein the sensing mechanism includes at least two ultra-wideband receivers.

13. The system of claim 11,
wherein each receiver module is configured to detect an angle of arrival (AOA) of a signal from a transmitting mechanism.

14. The system of claim 13,
wherein while determining the location of a target transmitting mechanism, the sensing mechanism is configured to compute a set of x, y, and z coordinates based on the respective AOA of a signal from the target transmitting mechanism detected by each receiver module in the sensing mechanism.

15. The system of claim 14,
wherein while determining the location of the target transmitting mechanism, the sensing mechanism is relocated so that signals from the target transmitting mechanism and at least one transmitting mechanism can be detected at the same time, wherein the locations of the at least one transmitting mechanisms relative to the reference frame has been determined.

16. The system of claim 11,
wherein the target transmitting mechanism is attached to an object;
wherein the sensing mechanism is further configured to determine the location of the target transmitting mechanism; and
wherein the result-generation mechanism is configured to produce a result to indicate a dimension and location of the object based on the location of the transmitting mechanism attached to the object.

17. The system of claim 16,
wherein while determining the location of each of the additional transmitting mechanism, the sensing mechanism is configured to detect simultaneously a signal from at least one transmitting mechanism the location of which relative to the reference frame has been determined.

18. The system of claim 11,
wherein the target transmitting mechanism is attached to an object; and
wherein the determined location of the target transmitting mechanism indicates a location of the object.

19. The system of claim 11, wherein the sensing mechanism is configured to:
use a number of measurements of the AOA data from the set of transmitting mechanisms; and
refine the locations of the target transmission mechanisms based on the measurements.

20. The system of claim 11, wherein the sensing mechanism is configured to use the transmitting mechanisms as a location infrastructure to track mobile sensors after the transmitting mechanisms are localized.

21. A computer readable storage medium storing instructions that when executed by a computer cause the computer to perform a method for locating a set of target transmitting mechanisms using a mobile sensing infrastructure, the method comprising:
detecting signals, at two receiver modules, each of which comprises a sensor, of a mobile sensing mechanism, from at least two reference transmitting mechanisms, each of which comprises a tag coupled to a device to be localized, wherein the two receiver modules are placed in fixed positions relative to each other on a mobile base that moves within four degrees of freedom;

determining a reference frame of the receiver modules on the mobile base of the mobile sensing mechanism based on the signals detected from the reference transmitting mechanisms over a time period when the mobile sensing mechanism moves within the four degrees of freedom;

determining locations of other target transmitting mechanisms, relative to the reference frame using the receiver modules on the mobile base of the sensing mechanism; and indicating the locations of the target transmitting mechanisms.

* * * * *